US008233916B2

(12) United States Patent
Shi et al.

(10) Patent No.: US 8,233,916 B2
(45) Date of Patent: Jul. 31, 2012

(54) METHOD OF AND SYSTEM FOR VIRTUAL MOBILE GAME SESSION DISCOVERY AND PLAYER MATCHING

(75) Inventors: Weidong Shi, Streamwood, IL (US); Jonathan R. Engelsma, Hudsonville, MI (US); James C. Ferrans, Wheaton, IL (US); Mathieu C. Hans, Hoffman Estates, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1169 days.

(21) Appl. No.: 11/839,901

(22) Filed: Aug. 16, 2007

(65) Prior Publication Data

US 2009/0047982 A1 Feb. 19, 2009

(51) Int. Cl.
*H04W 24/00* (2009.01)

(52) U.S. Cl. .................................................. 455/456.3
(58) Field of Classification Search ..... 455/456.1–456.6
See application file for complete search history.

(56) References Cited

U.S. PATENT DOCUMENTS

| | | | |
|---|---|---|---|
| 6,524,189 B1 * | 2/2003 | Rautila | 463/40 |
| 6,678,535 B1 * | 1/2004 | Narayanaswami | 455/557 |
| 6,697,638 B1 * | 2/2004 | Larsson et al. | 455/553.1 |
| 6,975,941 B1 * | 12/2005 | Lau et al. | 701/213 |
| 7,410,170 B1 * | 8/2008 | Roach et al. | 273/146 |
| 2002/0061743 A1 * | 5/2002 | Hutcheson et al. | 455/426 |
| 2004/0002384 A1 * | 1/2004 | Multerer et al. | 463/42 |
| 2005/0105496 A1 | 5/2005 | Ambrosino | |
| 2005/0107065 A1 * | 5/2005 | Bernhart | 455/405 |
| 2005/0223086 A1 | 10/2005 | Raverdy et al. | |
| 2006/0058102 A1 * | 3/2006 | Nguyen et al. | 463/39 |
| 2006/0128311 A1 | 6/2006 | Tesfai | |
| 2006/0194589 A1 * | 8/2006 | Sankisa | 455/456.1 |
| 2008/0293494 A1 * | 11/2008 | Adiraju et al. | 463/42 |

FOREIGN PATENT DOCUMENTS

GB   2391767 A   2/2004

OTHER PUBLICATIONS

Pering et al.; "Cool Spots: Reducing the Power Consumption of Wireless Mobile Devices With Multiple Radio Interfaces"; MobiSys '06, Jun. 19-22, Uppsala, Sweden; Copyright 2006 ACM 1-59593-195-3/06/2006pp. 220-232.

* cited by examiner

*Primary Examiner* — Steven Lim
(74) *Attorney, Agent, or Firm* — Stephen H. Shaw

(57) ABSTRACT

A system for establishing multi-party wireless game sessions includes a game session broker and at least two wireless units. Each wireless unit includes a first wireless device having relatively low power consumption and a second wireless device having relatively high power consumption. The game session broker is configured to receive a session ready message that includes location information for a first player and search for a second player having location information matching the location information for the first player. Upon finding a matching player, the game session broker sends session available messages to the wireless units associated with the first and second players. Session ready messages are sent and session available message are received using the first wireless devices. Upon receiving the session available message, the first and second players can establish a wireless game session using their respective second wireless devices. Preferably, the second wireless devices are maintained powered-off until a session available message is received.

17 Claims, 8 Drawing Sheets

| UNIT ID /401 | TIME /403 | SSID /405 | SIGNAL STRENGTH /407 |
|---|---|---|---|
| 3215551234 | 90 MINUTES | a | x dB |
| | | b | y dB |
| | | c | z dB |

*FIG. 4*

| UNIT ID /501 | TIME /503 | SIGNAL STRENGTH /505 |
|---|---|---|
| 3215551234 | 90 MINUTES | 30-18-01.2N<br>97-44-50.3W |

*FIG. 5*

| UNIT ID ~601 | LOCATION ~603 | PLAY TIME WINDOW ~605 | PREFERRED GAMES ~607 | PREFERRED PLAYERS ~609 | SESSION TECHNOLOGY ~611 | PROXIMITY ~613 |
|---|---|---|---|---|---|---|
| 3215551234 | XY | 11:00–13:30 | FINAL FOUR<br>NINJA<br>FIRE FIGHT | 3215556789<br>3215554321<br>3215552345<br>3215559876 | WiFi<br>BLUETOOTH | 100 METERS<br>10 METERS |
| 3215552345 | YX | 11:00–12:00 | NINJA<br>MAYHEM<br>FIRE FIGHT | 3215556789<br>3215554321<br>3215551234<br>3215559876 | BLUETOOTH | 10 METERS |
| 3215554321 | WZ | 11:10–13:00 | DOG FIGHT<br>NINJA<br>FIRE FIGHT | 3215559898<br>3215552345<br>3215559876<br>3215551928 | WiFi | 100 METERS |
| 3215556789 | XY | 11:30–12:15 | MAYHEM<br>DOG FIGHT<br>FINAL FOUR | 3215553746<br>3215554567<br>3215551234<br>3215559876 | WiFi<br>BLUETOOTH | 100 METERS<br>10 METERS |

*FIG. 6*

METHOD OF AND SYSTEM FOR VIRTUAL MOBILE GAME SESSION DISCOVERY AND PLAYER MATCHING

BACKGROUND OF THE INVENTION

The present invention relates generally to the field of wireless communications, and more particularly to a method of and system for discovering and matching parties for wireless multi-party interactive sessions, such as games.

Today's mobile platforms often comprise multiple communication and radio interfaces such as wireless local area network (WLAN) (e.g., WiFi), Bluetooth, or cellular, for carrying real-time networked game play traffic in addition to wireless telephone and internet access. For players in close proximity to each other, it is preferred to run a multi-player game session over a low latency and high bandwidth network interface such as a WLAN (e.g., WiFi), which covers a range of about 100 m, or Bluetooth, which covers a range of about 10 m. Also, ad hoc peer-to-peer sessions using WiFi or Bluetooth are free of charge, whereas sessions over a third party network may involve charges. The emerging growth of high-bandwidth local area mobile communications capabilities and handsets will enable new opportunistic mobile gaming scenarios and businesses. For example, a mobile game player may discover and engage with other mobile game players opportunistically via high-bandwidth local wireless networks in places such as shopping malls, cafeterias, coffee shops, airports, schools, and the like.

The availability of multiple communication channels or radio interfaces on mobile devices for mobile casual game play can help a mobile user discover more game play opportunities but, at the same time, it presents new challenges. According to a recent study, the multiple wireless interfaces consume approximately 70% of the total power for a connected mobile device in idle mode. An overwhelming portion of the wireless interface power is consumed by the WiFi interface. For peer-to-peer (P2P) based opportunistic mobile game play, a game session hosting mobile device has to keep its WiFi interface powered up and wait for incoming connections. For an opportunistic mobile game player who wants to search for other available mobile game sessions via the WiFi interface, the mobile game player's mobile unit has to scan the air constantly or frequently in order to locate another nearby WiFi based game session. This type of P2P mobile opportunistic game session discovery and management is very inefficient in terms of power consumption.

SUMMARY OF THE INVENTION

Embodiments of the present invention provide systems and methods for establishing multi-party wireless interactive sessions. The system includes a session broker and a plurality of wireless units. The wireless units each include a first wireless device having relatively low power consumption and a second wireless device having relatively high power consumption. An example of wireless device having relatively low power consumption is a cellular phone radio. Examples of wireless devices having relatively high power consumption are WLAN radios, such as WiFi.

The game broker is configured to receive a session ready message, which includes location information for a first party, and search for a second party having location information matching the location information for the first party. Upon finding a matching party, the game session broker sends session available messages to the first and second parties. The session ready message is sent and the session available message is received using the first wireless device. Upon receiving the session available message, the first and second parties can establish a session using their respective second wireless devices. Preferably, the second wireless devices are maintained powered-off until a session available message is received.

Wireless units according to embodiments of the present invention may be configured to obtain location information. For example, a wireless unit may include a GPS receiver. Alternatively, a wireless unit may be configured to measure the signal strength of one or more sources, such as WLAN access points, Bluetooth proximity beacons, RFID tags, and the like. The session broker may be configured to determine a location from signal strengths and calculate the distance between locations.

The session broker may maintain session profile information for players. For example, in the field of games, session profile information may include preferred games, preferred opponents, preferred technology, and the like. A session ready message may include time availability information for a party. The session broker may maintain a list of players, and their respective locations, currently available to play. The session broker searches the list of currently available players for location matches.

BRIEF DESCRIPTION OF THE DRAWINGS

FIG. 4 illustrates an embodiment of a session ready format according to the present invention.

FIG. 5 illustrates an alternative embodiment of a session ready message format according to the present invention.

FIG. 6 illustrates an embodiment of an active player list according to the present invention.

DETAILED DESCRIPTION

Figure 1:
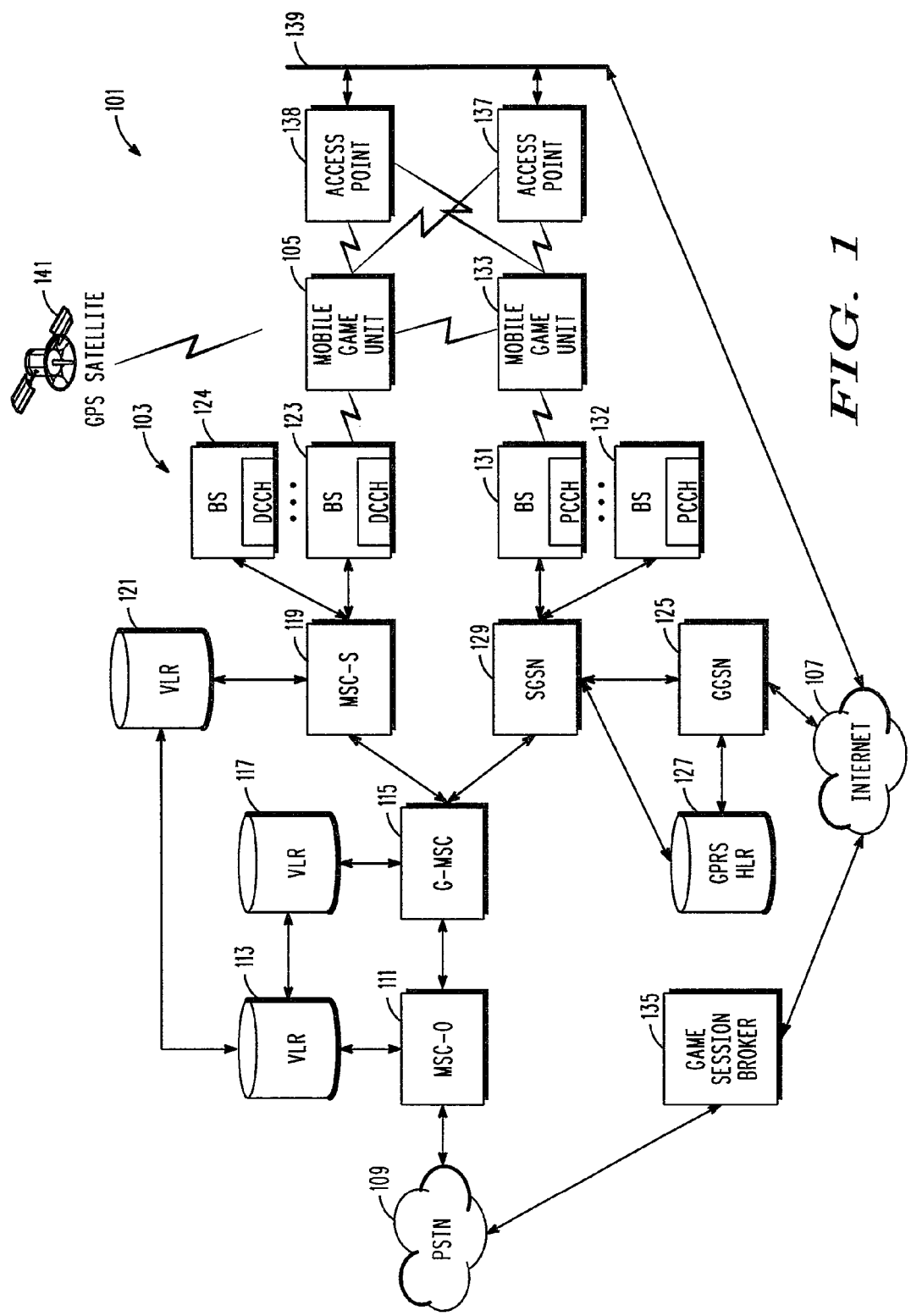
FIG. 1 is a block diagram of a system according to the present invention.

Referring now to the drawings, and first FIG. 1, a system according to the present invention is designated generally by the numeral 101. System 101 includes a packet radio service (e.g., GPRS, EDGE, CDMA) system 103. Packet radio service system 103 enables a mobile unit, such as mobile game unit 105, to access both a data network, such as the Internet 107, and a public switched telephone network (PSTN) 109. An originating mobile switching center (MSC-O) 111 provides an interface between a packet radio service system such as GPRS system 103 and PSTN 109. In one embodiment where the packet radio service is GPRS, an HLR 113 provides MSC-O 111 subscriber and location information for the mobile units in its home area. A Gateway mobile switching center (G-MSC) 115 is connected to MSC-0 111 and a visitor location register (VLR) 117. VLR 117 provides location information to HLR 113. A servicing mobile switching center (MSC-S.) 119 is connected to G-MSC 115 and a VLR 121. VLR 121 provides location information to HLR 113. MSC-S 119 is connected to a plurality of base stations, including base stations 123 and 124, which use digital control channels (DCCHs) for paging and registration of mobile units and their respective areas.

A Gateway GPRS support node print (GGSN) 125 provides an interface between Internet 107 and GPRS system 103. A GPRS HLR 127 provides GGSN 125 with location and subscriber information. GGSN 125 and GPRS HLR 127 are in communication with a servicing GPRS support node (SGSN) 129, which communicates with mobile units in its area through a plurality of base stations, including base stations 131 and 132. Base stations 131 and 132 use packet control channels (PCCHs) for paging and registration of mobile units in their respective areas.

System 101 includes a game session broker 135. As will be explained in detail hereinafter, game session broker 135 communicates with mobile game units 105 and 133. Game session broker 135 maintains game player profile information. Game session broker 135 maintains location information for registered mobile game units and it provides session availability information to registered mobile game units. While the present invention is illustrated and described with reference to interactive multiparty games, it will be recognized that embodiments of the invention may be applied to multiparty interactive sessions in general.

Those skilled in the are will recognize that GPRS system 103 is only one example of a wireless cellular communication system. GPRS system 103 enables communication between game session broker 135 and mobile game units 105 and 133 either via PSTN 109 or Internet 107. However, game units 105 and 133 may also communicate with game session broker 135 solely through a cellular telephone system. Additionally, while game session broker 135 is illustrated in FIG. 1 as being outside GPRS system 103, those skilled in the art will recognize that a game session broker could be part of the infrastructure of a cellular communication system.

System 101 may include one or more wireless local area network (WLAN) (e.g., WiFi) access points 137 and 139. WLAN access points 137 and 138 may be interconnected by a local area network (LAN) 139. LAN 139 may be connected to Internet 107. As is known to those skilled in the art, mobile game units 105 and 133 may communicate with WLAN access points 137 or 138 and with each other either through WLAN access points 137 and/or 138 or directly with each other via ad hoc wireless communications. Mobile game units 105 and 133 may be GPS enabled, whereby they can obtain location information from one or more GPS satellites 141.

Figure 2:
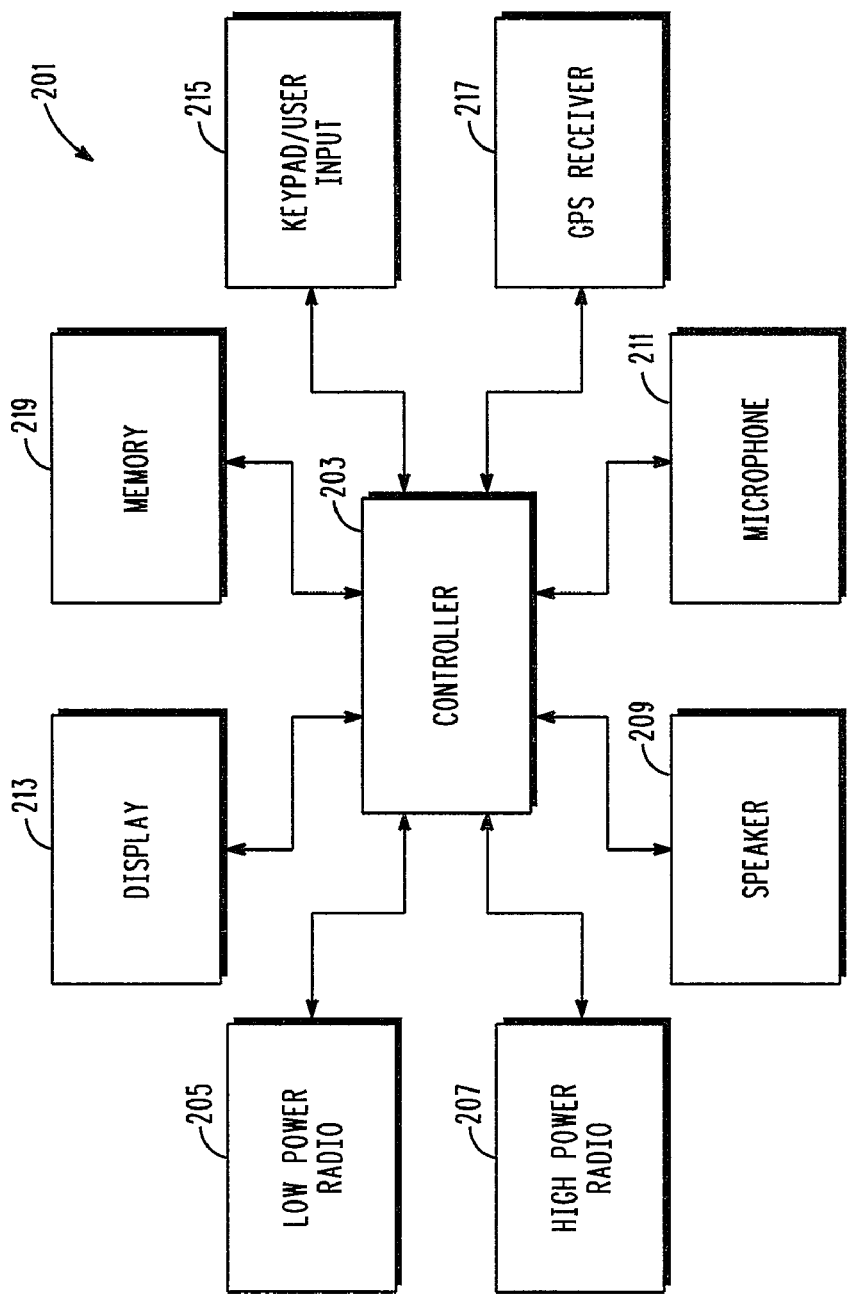
FIG. 2 is a block diagram of a game enabled mobile unit according to the present invention.

Referring now to FIG. 2, a block diagram of a game enabled wireless telephone is designated generally by the numeral 201. A controller 203 receives inputs from and provides outputs to various devices. Game enabled wireless telephone 201 includes a low-power radio 205, which in the preferred embodiment is a cellular phone transceiver. Game enabled wireless telephone 201 also includes at least one high-power radio 207. High-power radio 207 may be a WLAN transceiver (e.g., WiFi) or any high-power transceiver in addition to low-power radio 205. In some embodiments of a game enabled wireless telephone, there can be plurality of high-power transceivers. In addition, a game enabled wireless telephone may include a radio for short range communications, such as Bluetooth.

Game enabled wireless telephone 201 includes a speaker 209 and a microphone 211 coupled to controller 203. Game enabled wireless telephone 201 also includes a display 213 coupled to controller 203. Display 213 may be a touch screen display. Game enabled wireless telephone 201 also includes a keypad and other user input device, the indicated generally at 215. In the embodiment of FIG. 2, game enabled wireless telephone includes a GPS receiver 217 couple to controller 203. Finally, memory 219 is coupled to controller 203.

Figure 3:
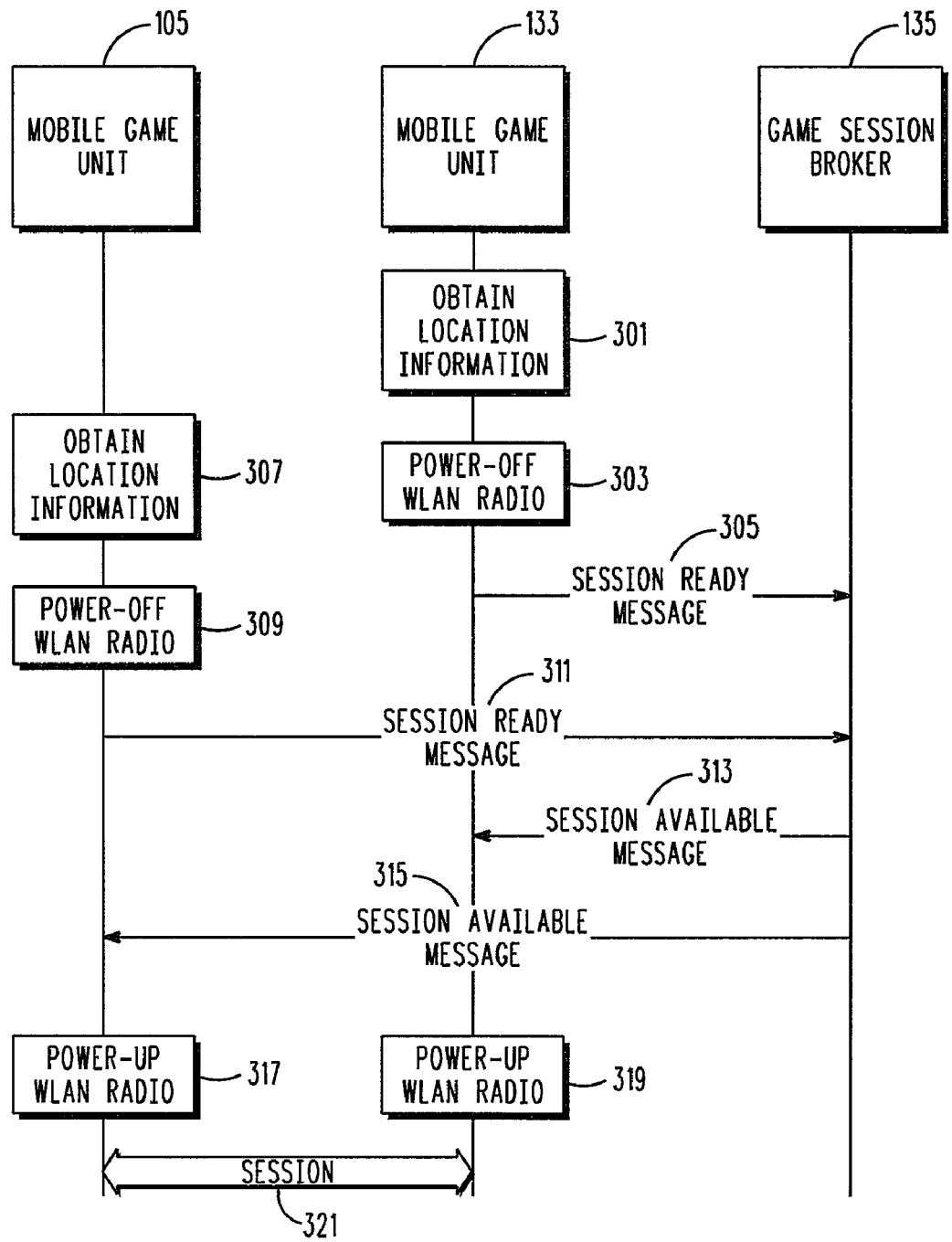
FIG. 3 is a high-level call flow diagram of an embodiment of the present invention.

FIG. 3 illustrates a high level call flow diagram signaling according to an embodiment of the present invention. Mobile game unit 133 obtains location information, as indicated generally at block 301. Location information may be obtained using the GPS system or by measuring the signal strength of access points (e.g., WLAN access point or a collocated Bluetooth device) in the vicinity of mobile game unit 133. After obtaining location information using one or more radio interfaces (e.g., WLAN or Bluetooth), mobile game unit 133 can power off the radio interfaces that are either idle or in high power consumption, as indicated at block 303. Then, as will be described in detail hereinafter, mobile game unit 133 sends a session ready message 305 to game session broker 135.

Similarly, mobile game unit 105 obtains location information, as indicated at block 307, and powers off its WLAN radio, as indicated at block 309. Then, mobile game unit 105 sends a session ready message 311 to game session broker 135. As will be explained in detail hereinafter, game session broker 135 maintains game profile information for registered mobile game units and it maintains location information for mobile game units that are available for play. When mobile game session broker 135 receives a session ready message it determines if another available mobile game unit is located near the mobile game unit from which it received the session ready message. In an example in FIG. 3, game session broker 135 determines that mobile game units 105 and 133 are located near each other. Game session broker 135 sends session available messages 313 and 315 to mobile game units 133 and 105, respectively. In response to receiving session available messages, mobile game units 105 and 133 power up their respective WiFi radios, as indicated at blocks 317 and 319, respectively. Then, mobile game units 105 and 133 may establish a wireless game session 321. Session 321 may be carried out over an ad hoc wireless network or through a WLAN access point or through a radio that is different from the radio interface used for uploading session information.

FIG. 4 illustrates a session ready message format according to an embodiment of the present invention. In the embodiment of FIG. 4, location information is obtained with reference to one or more of WLAN access points. The format of FIG. 4 includes a unit ID field 401, which contains an identifier for the wireless unit. It can be in the form of identifier such as a telephone number. The format of FIG. 4 includes a time field 403, which indicates the time period during which the mobile game unit will be available for game play. In the embodiment of FIG. 4, the time period is specified as a number of minutes following the sending time of the session ready message. In other embodiments, the time available for play could be specified in terms of an end time. In other embodiments, the time may be indefinite, in which case the player is maintained in the list of available players until the player logs out. The message format of FIG. 4 includes a service set identifier (SSID) field 405. SSID field 405 contains a unique identifier for each WiFi access point within range of the mobile game unit. Finally, the format of FIG. 4 includes a signal strength field 407, which contains the signal strength measured by the mobile game unit for each WLAN access point within range of the mobile game unit.

FIG. 5 illustrates a session ready message format according to another embodiment of the present invention. The message format of FIG. 5 includes a unit ID field, which contains the identification of the sending mobile game unit. The message format of FIG. 5 includes a time field, which specifies the time during which the mobile game unit is available for play.

Finally, the message format includes a position field 505 (e.g., relative or fixed position such as GPS, CellID, or position relative to fixed access points), which contains fixed or relative geographical coordinates of the game unit.

FIG. 6 illustrates a list of available players according to an embodiment of the present invention. The list of available players is maintained by game session broker 135. When game session broker 135 receives a session ready message, it populates the list of available players with the unit ID 601, location 603, and playtime window 605 of the mobile game unit from whom the game ready message is received. In one embodiment of the present invention, players are registered with the game session broker 135. Game session broker 135 maintains profile information for each registered player. Profile information may include such things as preferred games 607, preferred players, 609, session technology 611, and proximity 613.

Figure 7:
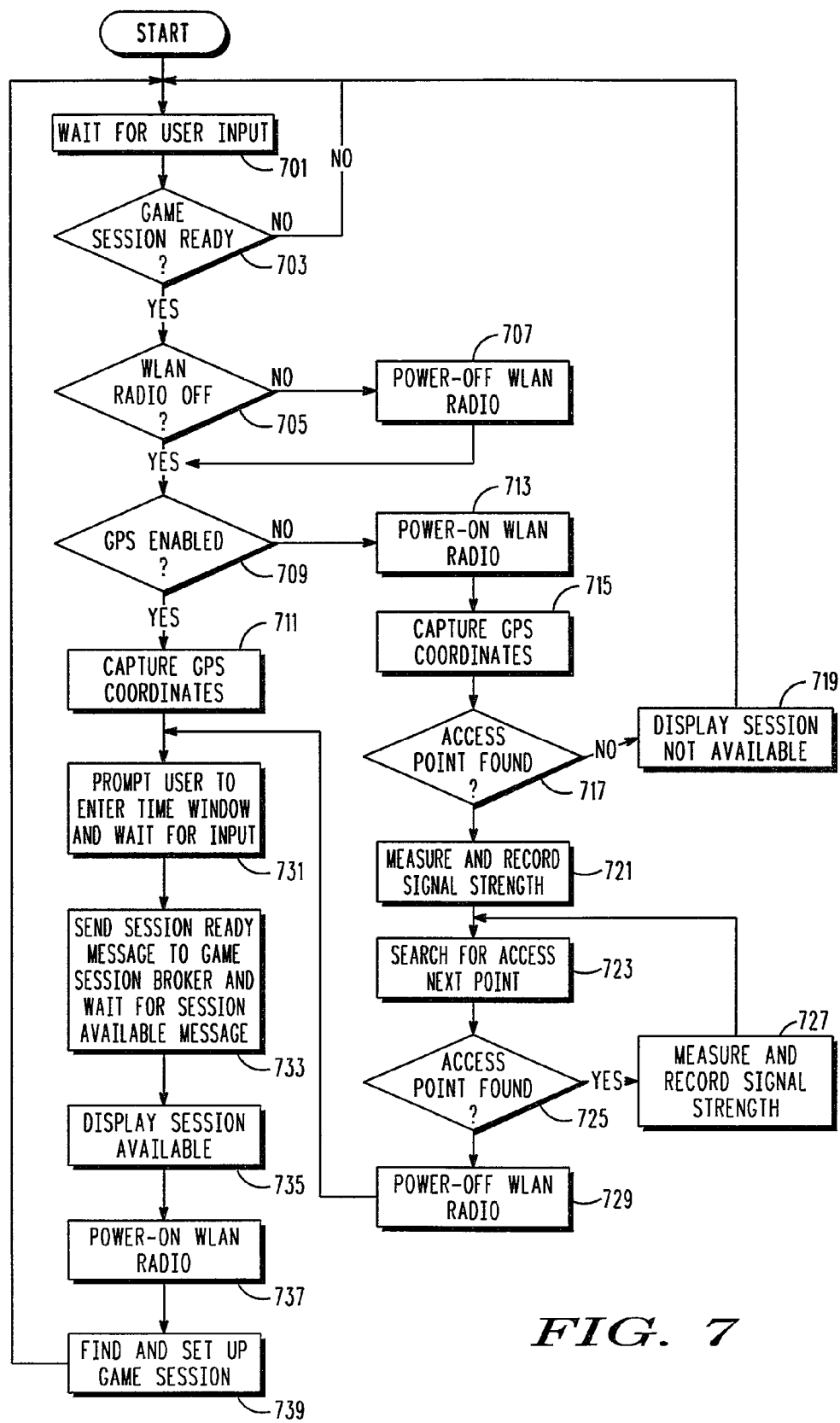
FIG. 7 is a high-level flowchart of an embodiment of mobile game unit processing according to the present invention.

FIG. 7 illustrates a high-level flowchart of mobile game unit processing according to the present invention. In one embodiment where a mobile game unit is GPS enabled and/or WLAN enabled, the mobile game unit waits for user input, as indicated generally at block 701. If, as determined at decision block 703, the user wishes to send a game session ready message, the mobile game unit determines, at decision block 705, if its WLAN radio is in the power off condition. If not, the mobile game unit powers off its WLAN radio, as indicated at block 707. Then, the mobile game unit determines, at decision block 709, if it is GPS enabled. If so, the mobile game unit captures its GPS coordinates, as indicated at block 711. If, as determined at decision block 709, the mobile game unit is not GPS enabled, the mobile game unit powers on its WLAN radio at block 713. Then, as indicated at block 715, the mobile game unit searches for a WLAN access point. If, as determined at decision block 717, a WLAN access point is not found, the mobile game unit displays a session not available message to the user at block 719 and processing returns to block 701. If, as determined at decision block 717, an access point is found, the mobile game unit measures the signal strength associated with the access point at block 721. Then, the mobile game unit searches for a next access point, as indicated at block 723. If, as determined at decision block 725, a next access point is found, then the mobile game unit measures its signal strength at block 727 and returns to block 73. The mobile game unit continues to search for and measure access point signal strength until, no more access points are found. Then, the mobile game unit turns off its WLAN radio, as indicated at block 729.

After the mobile game unit has determined its position, either with reference to captured GPS coordinates or WLAN access point signal strength, the mobile game unit prompts the user to enter a time window and then waits for user input, as indicated at block 731. In some embodiments, the user may not be prompted to enter a time, in which the session availability time is indefinite. Upon receipt of the time window input, the mobile game unit sends a session ready message to the game session broker and waits for a session available message, as indicated at block 733. In some embodiments, the mobile game unit may periodically determine its position and send a new session ready message whenever its position has changed since its last session ready message. Upon receipt of a session available message, the mobile game unit displays session available, as indicated at block 735. The game unit may also issue an audible signal to alert the user that a session is available. Then, as indicated at block 737, the mobile game unit powers on its WLAN radio and finds and sets up a game session, as indicated at block 739.

Figure 8:
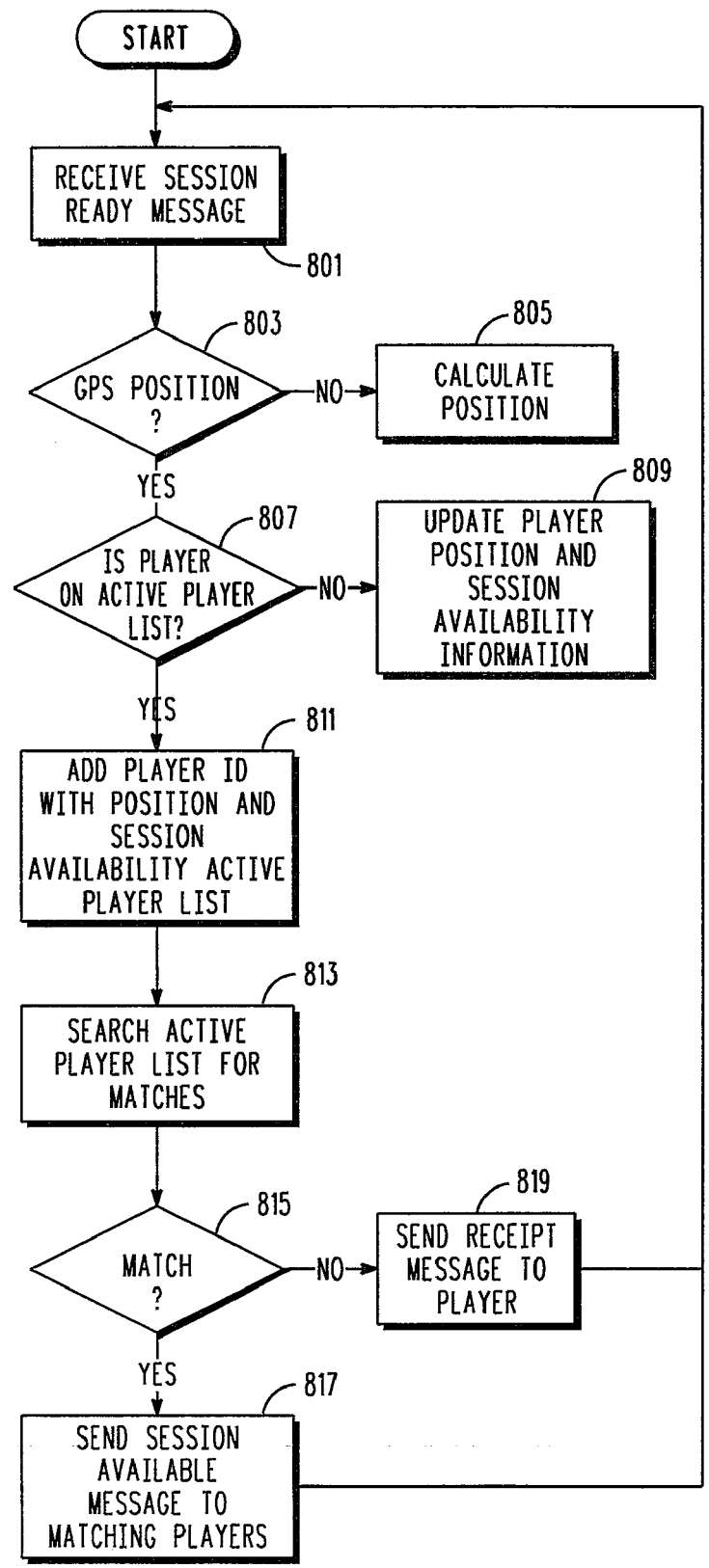
FIG. 8 is a high-level flowchart of game session broker processing according to the present invention.

FIG. 8 illustrates a high-level flowchart of an embodiment for the session broker processing according to the present invention. When the session broker receives a session ready message, as indicated at block 801, the session broker determines, at decision block 803, if their GPS position is specified. If not, the game session broker calculates a position with reference to WLAN access point signal strengths, as indicated at block 805. The game session broker knows the geographic position of each WLAN access point in its area. The game session broker is able to estimate distance from signal strength. Accordingly, the game session broker can determine a mobile game unit's position by solving a range or triangulation problem. Additionally, if two mobile game units are in proximity to the same WLAN access point, then they are in proximity to each other. Those two mobile game units may establish a game session directly with each other through an ad hoc wireless network or through the WLAN access point. Similarly, if two mobile game units are in proximity to different WLAN access points that are members of the same LAN, they can establish a wireless game session through that LAN.

After having determined the sending game unit's position, the session broker determines, at decision block 807, if the player is on the list of active players. If so, the session broker updates the list of active players with the player's position and session availability information, as indicated at block 809. If the player is not already on the list of active players, then the session broker adds the player ID with its position and session availability time window to the list of active players, as indicated at block 811. Then, the game session broker searches the list of active players for a match, as indicated generally at block 813. The search for matches includes at least a search of matching locations. As used herein, locations are matching if the mobile game units can establish a wireless game session either through one or more WLAN access points or directly through an ad hoc wireless network. The search may also include search for a preferred players, preferred technology, and preferred games. If, as determined at decision block 815, there is a match, the session broker sends session available messages to each matching player, as indicated at block 817. If, as determined at decision block 811, there are no matches, then the session broker sends a received message to the player, at block 819.

Figure 9:
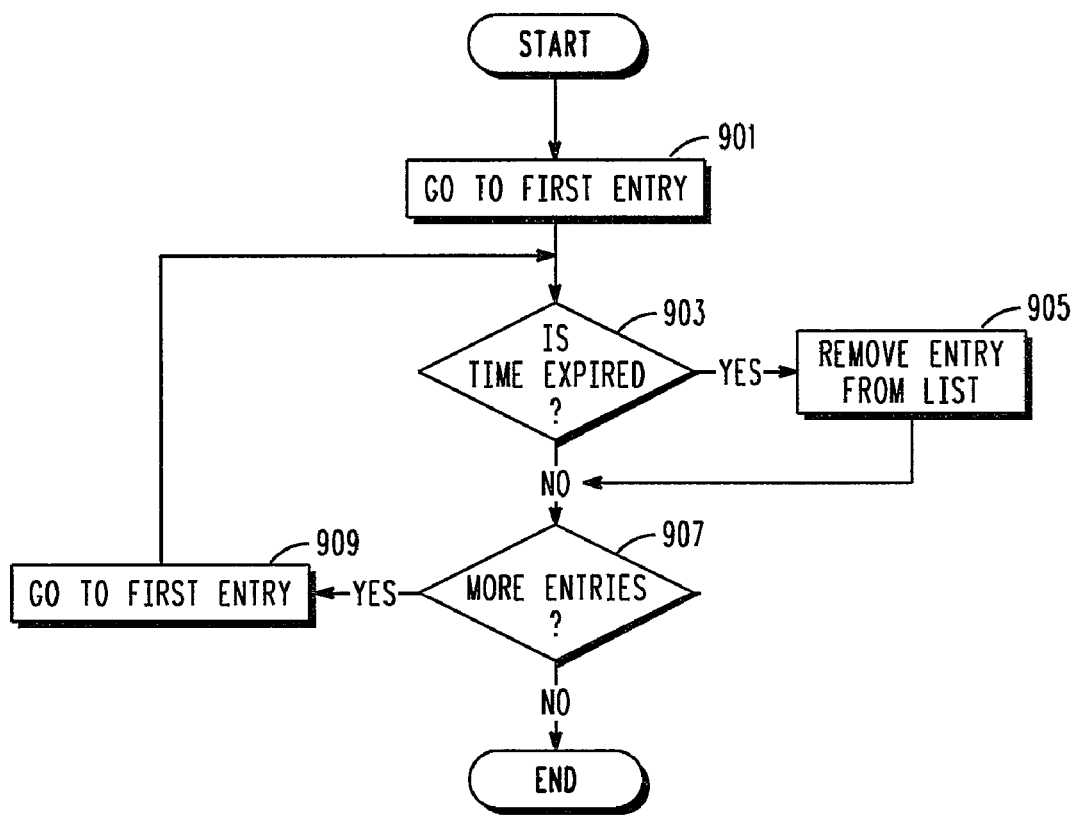
FIG. 9 is a high-level flowchart of active player list cleanup processing according to the present invention.

FIG. 9 is a high-level flowchart of active player list cleanup processing according to an embodiment of the present invention. Periodically, the session broker goes to a first entry on the list of active players, as indicated at block 901. The session broker tests at decision block 903 if time is expired for the first entry. If so, the entry is removed from the list, as indicated at block 905. Then, the session broker tests, at decision block 907, if there are more entries in the list. If so, goes to the next entry on the list. In the embodiment of the invention in which a player remains on the active player list until the play logs off, the session broker would remove the player from the active player list upon receipt of a log off message from the player.

From the foregoing, it may be seen that embodiments of the invention are well adapted to overcome the shortcomings of the prior art. While the invention has been illustrated and described with respect to presently preferred embodiments, those skilled in the art, given the benefit of this disclosure, will recognize alternative embodiments. Accordingly, the foregoing disclosure is intended for purposes of illustration and not of limitation.

What is claimed is:

1. A method of establishing a multiparty wireless interactive session within a game enabled mobile unit, the game enabled mobile unit comprising a first and a second wireless radio, method comprising the steps of:

the game enabled mobile sending a session ready message to a session broker using the first wireless radio, said session ready message including location information;

the game enabled mobile receiving a session available message from said session broker using said first wireless radio;

the game enabled mobile sending a new session ready message to said session broker using a first wireless radio when said location information changes, and;

in response to receiving said session available message, the game enabled mobile initiating a session using the second wireless radio.

2. The method as claimed in claim 1, wherein said first wireless radio consumes less power than said second wireless radio.

3. The method as claimed in claim 2, wherein said first wireless radio includes a cellular telephone radio.

4. The method as claimed in claim 2, wherein said second wireless radio includes a wireless local area network radio.

5. The method as claimed in claim 2, wherein said second wireless radio includes a Bluetooth radio.

6. The method as claimed in claim 1, wherein said location information includes proximity information with respect to at least one wireless local area network access point.

7. The method as claimed in claim 6, wherein said proximity information includes strength of a signal received from said access point.

8. The method as claimed in claim 1, wherein said location information includes a GPS position.

9. The method as claimed in claim 1, including:
powering-off said second wireless radio prior to receiving said session available message.

10. The method as claimed in claim 1, including:
powering-on said second wireless radio in response to receiving said session available message.

11. The method as claimed in claim 1, including, prior to sending said session ready message:
powering-on said second wireless radio;
obtaining said location information using said second wireless radio; and,
powering-off said second wireless radio.

12. The method as claimed in claim 1, including:
maintaining said second wireless radio in powered-off condition during at least a portion of a time interval between sending said session ready message and receiving said session available message.

13. An interactive wireless radio, which comprises:
a first radio having a first power consumption;
a second radio having a second power consumption, said second power consumption being greater than said first power consumption, wherein the first and the second radio are part of the interactive wireless radio;
means for sending a session ready message to a session broker using said first radio; including means for sending a new session ready message to said session broker using a first wireless radio when said location information changes;
means for receiving a session available message from said session broker using said first radio; and,
means responsive to receiving said session available message for establishing a multiparty wireless session using said second radio.

14. The game device as claimed in claim 13, including:
means for obtaining location information; and,
means for including said location information in said session ready message.

15. The game device as claimed in claim 14, wherein said means for obtaining location information includes a GPS receiver.

16. The game device as claimed in claim 14, wherein said means for obtaining location information means for measuring a signal strength using said second radio.

17. The game device as claimed in claim 14, including:
means for powering on said second radio in response to receiving said session available message.

* * * * *